(12) United States Patent
Kim et al.

(10) Patent No.: US 8,591,615 B2
(45) Date of Patent: Nov. 26, 2013

(54) DUST COLLECTING APPARATUS OF VACUUM CLEANER HAVING FUNCTION OF REMOVING DUST DETACHED FROM FILTER

(75) Inventors: Tak-Soo Kim, Gwangju (KR); Joo-Seok Jeong, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 12/790,664

(22) Filed: May 28, 2010

(65) Prior Publication Data
US 2010/0319307 A1 Dec. 23, 2010

Related U.S. Application Data

(60) Provisional application No. 61/187,699, filed on Jun. 17, 2009.

(30) Foreign Application Priority Data

Aug. 10, 2009 (KR) .................. 10-2009-0073101

(51) Int. Cl.
*B01D 46/04* (2006.01)

(52) U.S. Cl.
USPC .................. 55/295; 55/337; 55/429; 55/430; 55/432; 55/466; 55/DIG. 3; 15/352; 15/353

(58) Field of Classification Search
USPC .................. 55/295, 305, 337, 429, 304, 428, 55/DIG. 3; 15/353, 352
See application file for complete search history.

(56) References Cited

U.S. PATENT DOCUMENTS

| | | | |
|---|---|---|---|
| 2,403,602 A | 7/1946 | Kitto | |
| 2,405,129 A | 8/1946 | Bible | |
| 4,246,011 A * | 1/1981 | Oberdorfer | 96/421 |
| 4,363,156 A * | 12/1982 | Leinfelt | 15/327.1 |
| 4,571,772 A * | 2/1986 | Dyson | 15/335 |
| 4,944,780 A * | 7/1990 | Usmani | 55/337 |
| 5,045,098 A * | 9/1991 | Poor | 55/300 |

(Continued)

FOREIGN PATENT DOCUMENTS

| | | |
|---|---|---|
| CN | 1791350 A | 6/2006 |
| CN | 1791351 A | 6/2006 |

(Continued)

OTHER PUBLICATIONS

International Search Report and Written Opinion issued on Jan. 19, 2011, in corresponding International Application No. PCT/KR2010/003533 (8 pages).

(Continued)

*Primary Examiner* — Duane Smith
*Assistant Examiner* — Minh-Chau Pham
(74) *Attorney, Agent, or Firm* — NSIP Law

(57) ABSTRACT

A dust collecting apparatus for a vacuum cleaner is provided. The dust collecting apparatus includes a centrifugal separating portion, a dust receptacle to collect dust which is separated by the centrifugal separating portion and a filter portion having a filter unit separating dust from an air current discharged from the centrifugal separating portion. The filtering portion further includes a dust removing unit to detach the filter dust caught in the filter unit, and a dust discharge member to move the filter dust to an upstream of the centrifugal separating portion.

16 Claims, 9 Drawing Sheets

(56) References Cited

U.S. PATENT DOCUMENTS

| | | | |
|---|---|---|---|
| 5,145,499 A * | 9/1992 | Dyson | 55/337 |
| 5,254,147 A * | 10/1993 | Finke | 55/337 |
| 5,267,371 A * | 12/1993 | Soler et al. | 15/327.5 |
| 5,922,092 A * | 7/1999 | Taylor | 55/295 |
| 5,950,274 A * | 9/1999 | Kilstrom | 15/350 |
| 6,083,292 A * | 7/2000 | Fumagalli | 55/345 |
| 6,141,826 A * | 11/2000 | Conrad et al. | 15/347 |
| 6,146,434 A * | 11/2000 | Scalfani et al. | 55/334 |
| 6,625,845 B2 * | 9/2003 | Hayashi et al. | 15/353 |
| 7,186,281 B2 * | 3/2007 | Cheng | 55/289 |
| 7,662,198 B2 * | 2/2010 | Jansen et al. | 55/337 |
| 7,862,637 B2 * | 1/2011 | Han et al. | 55/345 |
| 7,867,308 B2 * | 1/2011 | Conrad | 55/345 |
| 8,012,250 B2 * | 9/2011 | Hwang et al. | 96/417 |
| 8,062,398 B2 * | 11/2011 | Luo et al. | 55/337 |
| 2004/0035295 A1 * | 2/2004 | Wang | 96/421 |
| 2006/0260281 A1 * | 11/2006 | Peng | 55/295 |
| 2007/0011996 A1 | 1/2007 | Tsuchiya et al. | |

FOREIGN PATENT DOCUMENTS

| | | |
|---|---|---|
| JP | 48-10345 | 4/1973 |
| JP | 2007-029586 | 2/2007 |
| JP | 2007-054549 | 3/2007 |
| JP | 2007-054552 | 3/2007 |
| JP | 2008-253376 | 10/2008 |
| KR | 10-2007-0098473 | 10/2007 |

OTHER PUBLICATIONS

Chinese Office Action issued Sep. 22, 2013 in counterpart Chinese Patent Application No. 201080027423.2 (14 pages including English Translation).

* cited by examiner

DUST COLLECTING APPARATUS OF VACUUM CLEANER HAVING FUNCTION OF REMOVING DUST DETACHED FROM FILTER

CROSS-REFERENCE TO RELATED APPLICATIONS

This application claims benefit under 35 U.S.C. §119(e)(1) of U.S. Provisional Application No. 61/187,699, filed on Jun. 17, 2009, in the United States Patent and Trademark Office, and the benefit under 35 U.S.C. §119(a) of Korean Patent Application No. 10-2009-0073101, filed on Aug. 10, 2009, in the Korean Intellectual Property Office, the entire disclosure of each of which is incorporated herein by reference for all purposes.

BACKGROUND

1. Field

The following description relates to a dust collecting apparatus of a vacuum cleaner, and more particularly, a dust collecting apparatus which removes dust caught in a filter member and removes filter dust which is separated from the filter member.

2. Description of the Related Art

Dust collecting apparatuses may generally be equipped with centrifugal separators and filters (or secondary filters) which filter out minute matters unfiltered in the centrifugal separators.

In general, a suction force in a dust collecting apparatus may deteriorate as dusts gradually accumulate on the secondary filter. Subsequently, efficiency of picking up matters, such as dusts, from a surface, or separating dust inside the centrifugal separator may be decreased. Accordingly, it is important to remove the accumulation of dusts from the secondary filter periodically.

Japan Registered Patent No. S48-10345 ("JP '345"), and Korean Registered Patent No. 10-0804568 ("KR '568") are directed to a vacuum cleaner structure which may remove minute particles of dust from the secondary filter.

However, these structures require a separate valve to open and close a flow passage, have a complicated structure and pressure loss, and may have an incomplete removal of the dusts from the secondary filter. Further, disassembling each component of the dust collecting apparatus may be inconvenient in JP '345 and KR '568, which may make maintenance work such as repair or replacement of components difficult.

SUMMARY

In one general aspect, there is provided a dust collecting apparatus for a vacuum cleaner, the dust collecting apparatus including a centrifugal separating portion, a dust receptacle to collect dust which is separated by the centrifugal separating portion and a filter portion having a filter unit separating dust from an air current discharged from the centrifugal separating portion. The filter portion further includes a dust removing unit to detach the filter dust caught in the filter unit, and a dust discharge member to forcibly move the filter dust to an upstream of the centrifugal separating portion.

The filtering portion may further include a filter casing including a dust discharge port which is formed therein and connected fluidly to the upstream of the centrifugal separating portion.

The filter casing may further include a shielding portion covering an upper portion of the dust discharge member.

The filter unit and the dust discharge member may be rotated together upon rotation of the filter unit.

The filter unit may further include a seating member to be rotated integrally with the dust discharge member, and the dust removing unit is contacted with an inner surface of the filter unit.

The dust discharge member may include a pipe engaged on a lower portion of the filter unit and a plurality of vanes connected to the pipe.

The plurality of vanes, when the filter unit is rotated, may move the detached filter dust to the dust discharge port.

The dust discharge member may further include a plurality of protrusions extending from an upper surface of the pipe in a radial direction.

The dust receptacle may be mountable to and demountable from the dust collecting apparatus.

The centrifugal separating portion, the dust receptacle and the filtering portion may be arranged in a horizontal direction in a parallel relationship.

The dust collecting apparatus may further include a dust receptacle mounting portion where the dust receptacle is mounted to and demounted from, and wherein the centrifugal separating portion includes upper and lower centrifugal separating portions which are detachably connected to each other, and the filtering portion includes upper and lower filtering portions which are detachably connected to each other, and the lower centrifugal separating portion, the lower filtering portion, and the dust receptacle mounting portion are integrally formed with each other.

The upper centrifugal separating portion and the upper filtering portion may be integrally formed with each other.

In another aspect, there is provided a dust collecting apparatus for a vacuum cleaner, the dust collecting apparatus including a suction pipe configured to draw in an external air stream, a centrifugal separating portion configured to receive the air stream from the suction pipe and separate dust therefrom, a filter portion having a filter unit and configured to receive the air stream from the centrifugal separating portion and remove residual dust from the air stream by passing the air stream through the filter unit, and a dust removing unit positioned in the filter portion and configured to detach the residual dust from the filter unit. The air stream is discharged from the filter portion after passing through the filter unit and the detached residual dust is discharged from the filter portion by a dust discharge member to an downstream portion of the suction pipe such that the detached residual dust is drawn into the centrifugal separating portion with a new external air stream through the suction pipe.

The filter unit may be selectively rotatable within the filter portion, to rotate relative to the dust removing unit. At least a portion of the dust removing unit contacts the filter unit to detach the residual dust therefrom.

In still another aspect, there is provided a dust collecting apparatus including a filter portion configured to receive an air stream, the filter portion including a filter unit through which and the air stream passes, and which separates dust from the air stream, a dust removing unit to detach dust from the filter unit upon action from an operator, and a dust discharge member to discharge the detached dust from the filter portion.

The filter unit may be rotated within the filter portion relative to the dust removing unit upon the action from the operator, and the dust removing unit includes a dust removing plate which contacts the filter unit and causes the dust to detach from the filter unit.

Other features and aspects will be apparent from the following detailed description, the drawings and the claims.

Figure 1:
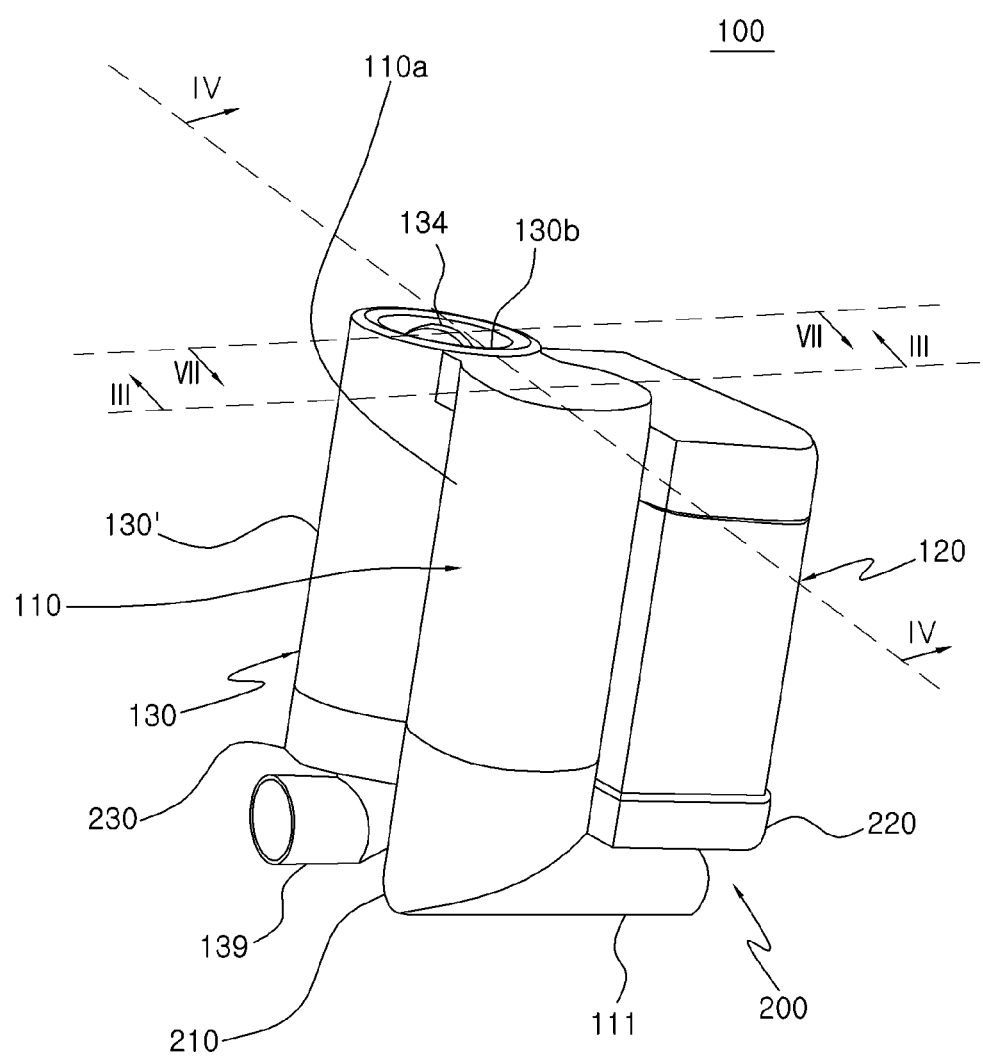
FIG. 1 is a perspective view of an example of a dust collecting apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Referring to FIG. 1, an example of a dust collecting apparatus 100 includes a centrifugal separating portion 110, a dust receptacle 120, and a filtering portion 130, which are arranged in a parallel relationship and in a horizontal direction.

The centrifugal separating portion 110 includes an upper centrifugal separating portion 110a and a lower centrifugal separating portion 210, which are separable from each other.

The filtering portion 130 includes an upper filtering portion 130' and a lower filtering portion 230, which are also separable from each other.

Figure 2:
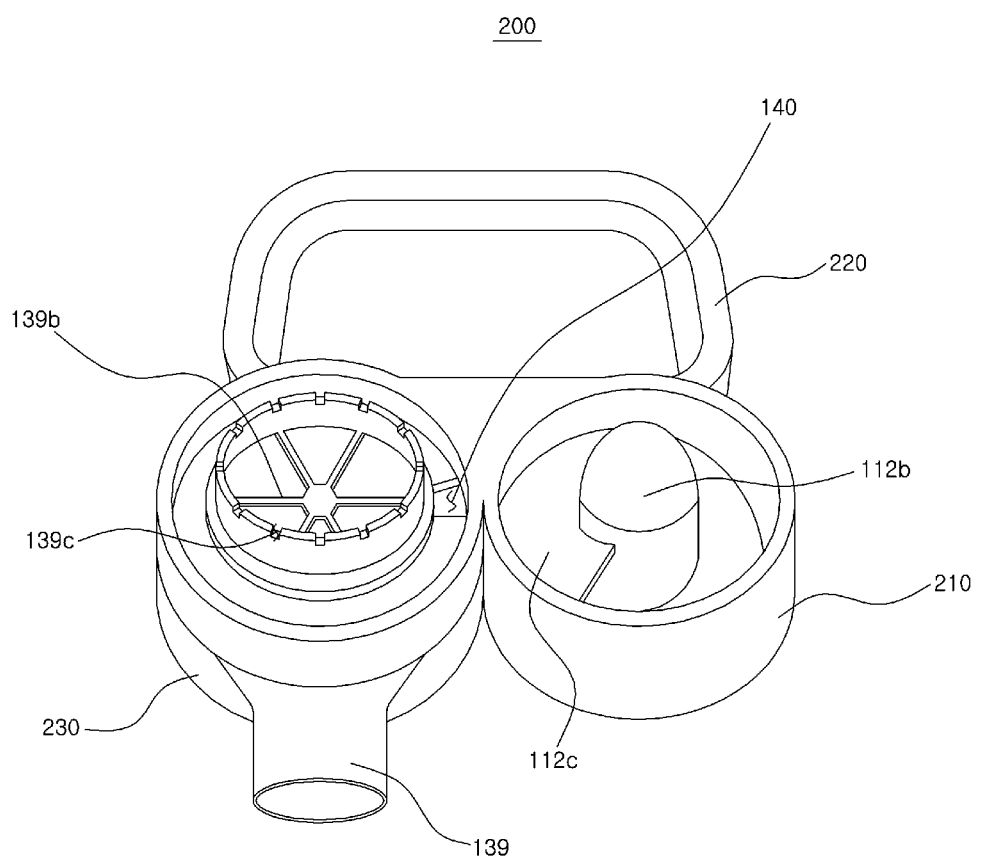
FIG. 2 is a perspective view of an example of a suction and discharge flow passage.

Referring to the example shown in FIG. 2, the lower centrifugal separating portion 210 and the lower filtering portion 230 may be connected to each other by the side portions thereof, and a dust receptacle seating portion 220 may be integrally connected to a side of the connecting area of the lower centrifugal separating portion 210 and the lower filtering portion 230 and may thereby define a suction and discharge flow passage 200.

In one example, the lower centrifugal separating portion 210 includes a stabilizer 112b, a guide 112c, and a suction pipe 111 (see FIG. 1). The lower filtering portion 230 includes a filter discharge pipe 139, a plurality of supporting holes 139c formed at predetermined intervals on an upper surface of the filter discharge pipe 139, and a supporting rib 139b formed in an interior thereof. A dust discharge port 140, which may be fluidly connected to the suction pipe 111 of the lower filtering portion 230, may be formed by penetrating.

Referring to FIG. 1, for example, the dust collecting apparatus 100 is assembled as the upper centrifugal separating portion 110a is connected to an upper portion of the lower centrifugal separating portion 210, the upper filtering portion 130' is connected to an upper portion of the lower filtering portion 230, and the dust receptacle 120 is mounted on the dust receptacle seating portion 220.

Figure 3:
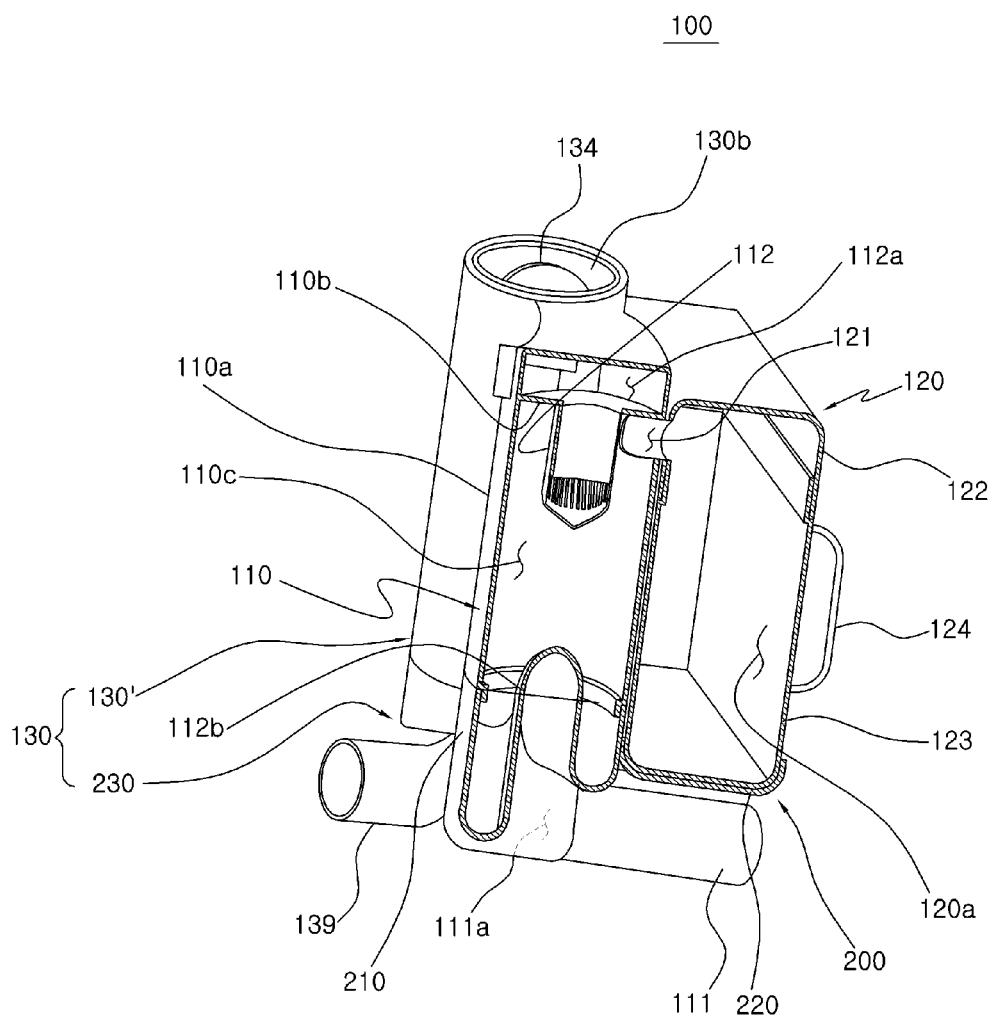
FIG. 3 is a cross section view of the example of the dust collecting apparatus of FIG. 1, taken on line III-III.

Referring to the example illustrated in FIG. 3, the centrifugal separating portion 110 includes the suction pipe 111, the stabilizer 112b, the guide 112c (FIG. 2), the discharge pipe 112, and a partitioning wall 110b to divide the interior into an upper space to serve as a discharge flow passage 112a and a lower space to serve as a centrifugal separating area 110c. The suction pipe 111 and the stabilizer 112b form the lower centrifugal separating portion 210, and the discharge pipe 112, the partitioning wall 110b, and the discharge flow passage 112a form the upper centrifugal separating portion 110a.

The suction pipe 111 may be fluidly connected to the centrifugal separating area 110c on a lower surface of the centrifugal separating portion 110. A dust collecting area 111a may be formed to collect filter dusts 10 (see FIGS. 8 and 9) which are discharged through the dust discharge port 140 (see FIG. 4).

The stabilizer 112b protrudes upwardly from a lower inner portion of the centrifugal separating area 110c so that the cross section thereof facing the discharge pipe 112 may be coaxially positioned.

The guide 112c may be formed along an outer circumference of the stabilizer 112 in a spiral pattern, to guide an air current, which is drawn into the suction pipe 111, so that the air current moves upwardly in a rotating movement inside the centrifugal separating area 110c.

The discharge pipe 112 protrudes downwardly from a lower central portion of the partitioning wall 110b to fluidly connect the centrifugal separating area 110c to the discharge flow passage 112a.

An opening 121 may be formed on an upper side of the centrifugal separating area 110c and be fluidly connected to the dust receptacle 120 to allow dust particles, which are centrifuged from the rotating air current, to be discarded into the dust receptacle 120.

Figure 4:
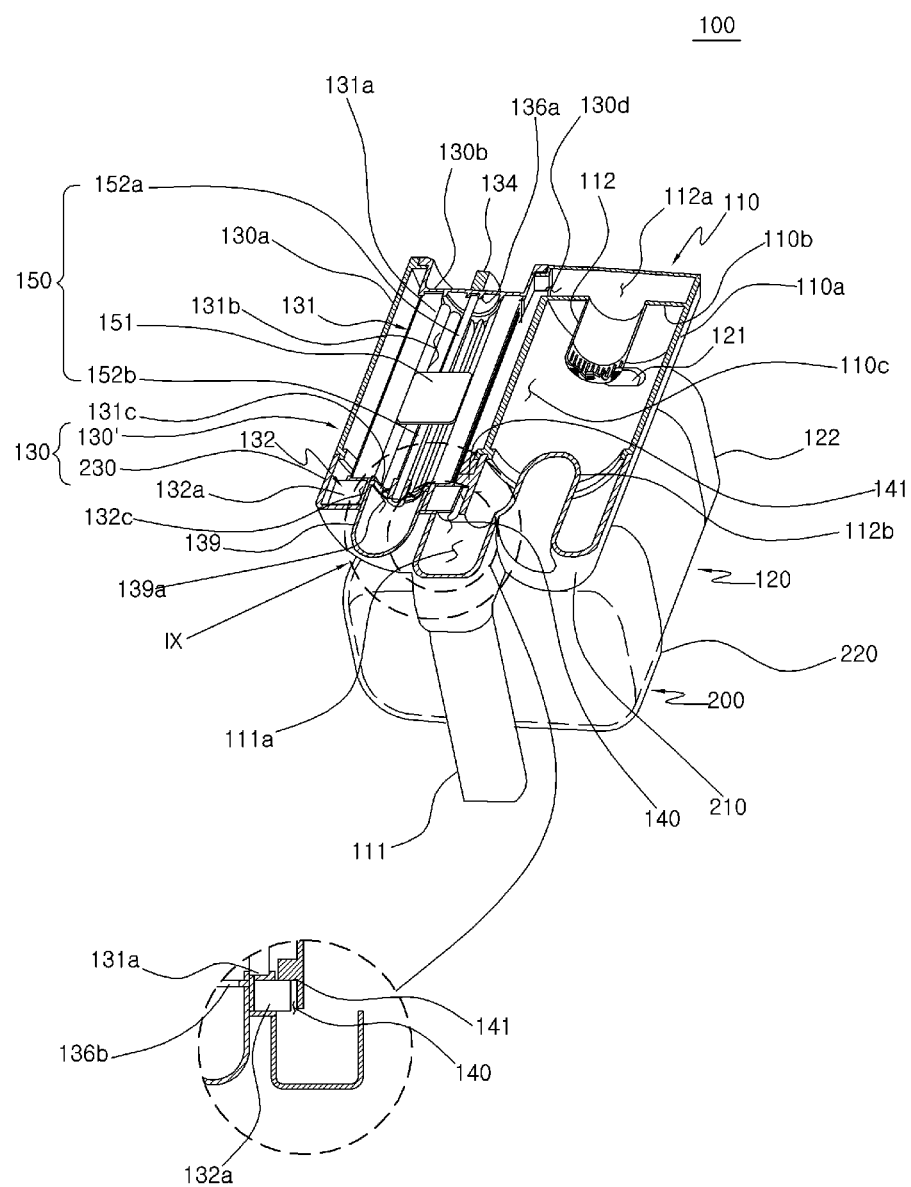
FIG. 4 is a cross section view of the example of the dust collecting apparatus of FIG. 1, taken on line IV-IV.

The discharge flow passage 112a may be formed in an upper inner area of the centrifugal separating portion 110 to cause the air current discharged from the centrifugal separating area 110c to be introduced into the filtering portion 130 through a filter inlet 130d (FIG. 4). As explained above, the discharge flow passage 112a may be isolated from the centrifugal separating area 110c by the partitioning wall 110b, so that efficient rotation of the air current inside the centrifugal separating area 110c may be provided and also so that relatively large and heavy dust particles included in the rotating air current may be prevented or deterred from entering the filtering portion 130.

The dust receptacle 120 includes an upper dust receptacle cover 122 which may be opened to allow the collected dust particles to be discarded, and a lower dust receptacle 123 (see FIG. 3) which stores dust particles in a dust collecting area 120a. The dust receptacle 120 may be fluidly connected to the centrifugal separating portion 110 via the opening 121, and detachably connected to the dust receptacle seating portion 220. A dust receptacle handle 124 may be formed on an outer surface of the dust receptacle 120. The dust receptacle 120 may be fixed to the centrifugal separating portion 110.

Referring to the example illustrated in FIG. 4, the filtering portion 130 includes an upper filtering portion 130' and a lower filtering portion 230. In this example, the upper filtering portion 130' includes a filter casing 130a, a filter casing cover 130b, a filter unit 131, a dust removing unit 150, and a dust discharge member 132. The lower filtering portion 230 includes a filter discharge pipe 139. The filter casing 130a includes the filter inlet 130d which may be formed on the upper portion thereof and fluidly connected to the discharge flow path 112a. The filter member 131a in the lower center portion of the filter casing 130a may filter out minute dust particles, so that air current, from which minute dust particles are removed, may be discharged out through the filter discharge pipe 139. The dust discharge port 140 may be fluidly connected to the dust collecting area 111a. A shielding portion 141 may be protruded from an inner surface of the filter casing 130a by a predetermined length to screen inter-vane areas 132c between vanes 132a (see FIG. 6) off from the inner area of the filter casing 130a.

The filter casing cover 130b may be connected to the upper portion of the filter casing 130a. The filter casing cover 130b may be opened and rotatable on the upper portion of the filter casing 130a. The filter casing cover 130b may also include a dust-removal handle 134 protruding from the upper portion thereof. Although in some examples a user may manually rotate the filter casing cover 130b, other examples are also applicable. For instance, a motor may be employed to provide a rotating force to the filter casing cover 130b.

Figure 5:
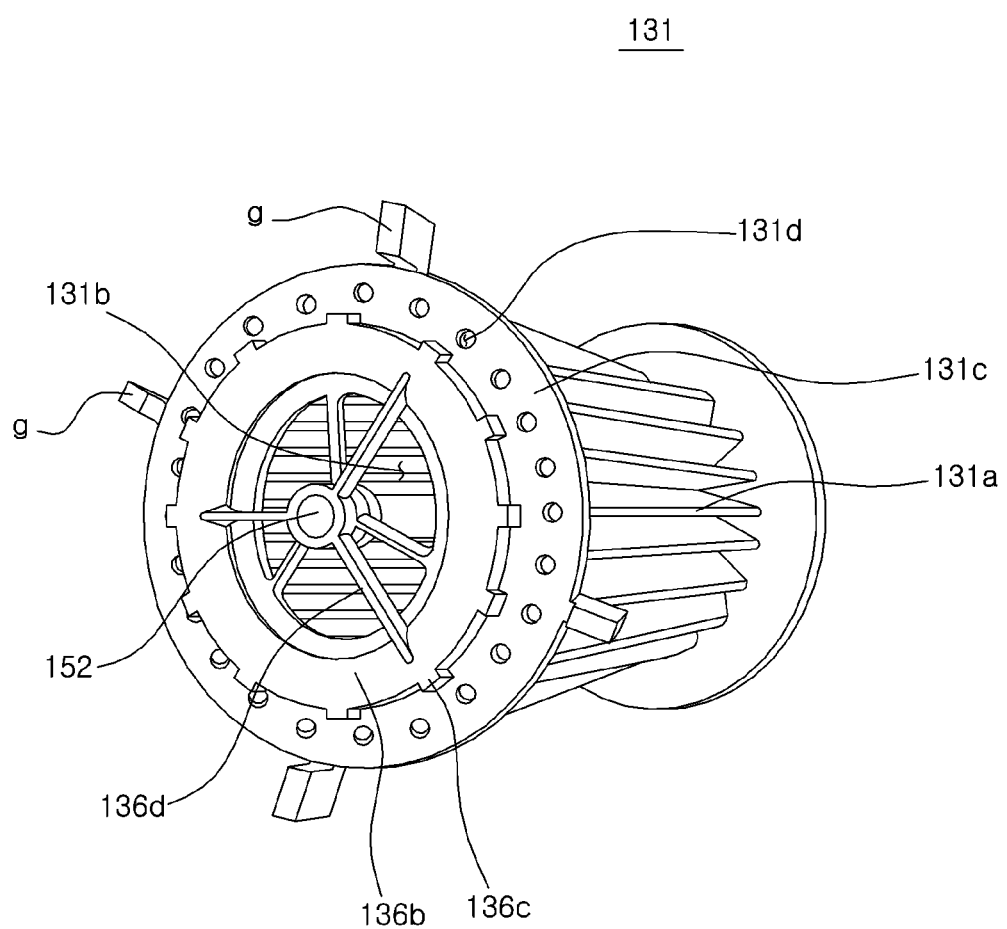
FIG. 5 is a bottom perspective view of an example of a filter unit.

Referring to FIGS. 4 and 5, for the purposes of example, the filter unit 131 includes a filter member 131a which may be attached to a lower surface of the filter casing cover 130b, and a seating member 131c which rotatably supports the filter member 131a from within the filter casing 130a. The lower surface of the filter member 131a may be connected to an upper surface of the seating member 131c, thereby forming the filter unit 131. The filter member 131a may be formed in a cylindrical structure which has a hollow portion 131b defined in the center thereof. The filter member 131a may be made from a foamed resin member or pleated member having minute pores formed therein.

The seating member 131c may have an annular structure in which a center portion is bored and connected fluidly to the hollow portion 131b and a filter discharge port 139a. The seating member may include a plurality of holes 131d formed in a lower surface (see FIG. 5) in a radial direction. The plurality of holes 131d correspond to a plurality of protrusions 132b of the dust discharge member 132 which is further explained below.

Referring to the examples illustrated in FIGS. 4 and 5, the dust removing unit 150 includes a dust removing plate 151, an upper portion support 152a, a lower portion support 152b, and a lower portion fixing member 136b. The dust removing plate 151 may be in contact with an inner surface of the filter member 131a. The upper portion support 152a may support the dust removing plate 151 and the upper portion of the dust removing plate 151, and may be connected to an upper portion fixing unit 136a formed on a lower surface of the filter casing cover 130b to allow the filter casing cover 130b to rotate. A lower portion of the lower portion support 152b may be fixed to the lower portion fixing member 136b so that the upper portion support 152a and the lower portion of the dust removing plate 151 are fixed in place and not rotated. The lower portion fixing member 136b includes a supporting frame 136d which has a center portion fit in the inner hollow portion of the lower portion fixing member 136b and a plurality of supports extended from the center portion in a radial pattern. A plurality of supporting protrusions 136c may be extended at predetermined intervals from each other in a radial pattern from an outer circumference of the lower portion fixing member 136b. The supporting protrusions 136c fix and thus limit or prevent the dust removing unit 150 from rotating, by being inserted into supporting holes 139c (see FIG. 2) which are formed in an upper surface of the filter discharge pipe 139.

Figure 6:
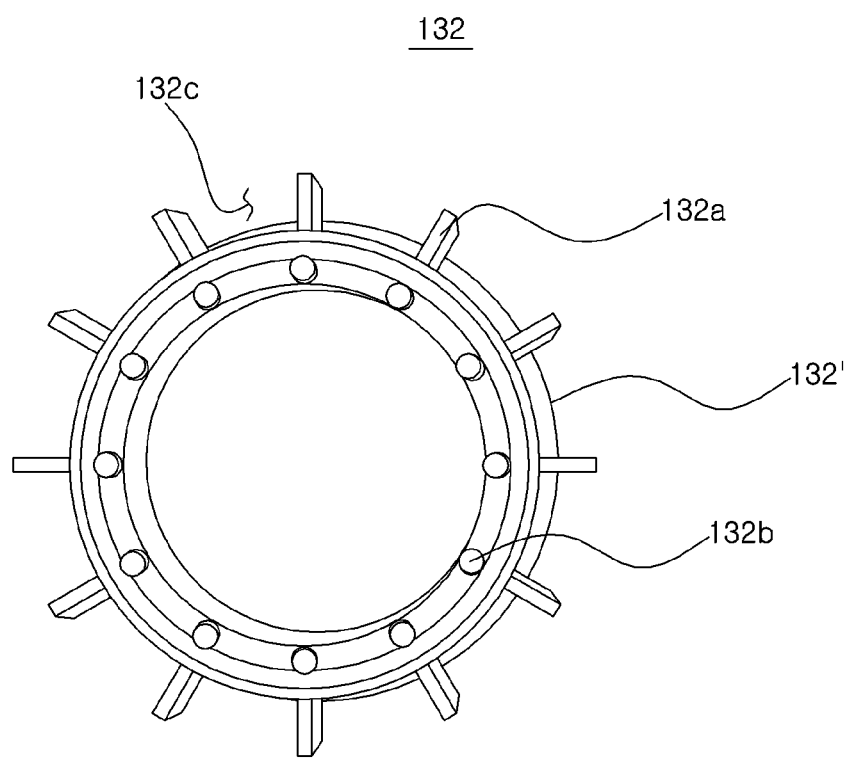
FIG. 6 is a perspective view of an example of a dust discarding unit.

Referring to FIG. 6, for example, the dust discharge member 132 may be formed as a cylindrical pipe 132' which includes a plurality of vanes 132a formed on an outer circumference in a radial pattern, and a plurality of protrusions 132b formed on an upper surface and may be inserted into the holes 131d (FIG. 5).

The connecting structure of the filtering portion 130 is explained below with reference to the examples of FIGS. 1 to 7.

The dust discharge member 132 may be connected to the outer circumference of the upper end of the filter discharge pipe 139 and herein, the upper end of the filter discharge pipe 139 may form the filter discharge port 139a. In this example, one of the inter-vane areas 132c between the vanes 132a is connected fluidly to the dust discharge port 140 (see FIG. 4).

The lower portion fixing member 136b may be seated on an upper surface of the filter discharge pipe 139. In such a situation, the supporting protrusions 136c formed on the outer circumference of the lower portion fixing member 136b are inserted into the supporting holes 139c (see FIG. 2) formed on the upper surface of the filter discharge pipe 139 to thereby limit or prevent the lower portion fixing member 136b from rotating.

When the lower portion fixing member 136b is seated on the upper surface of the filter discharge pipe 139, the filter unit 131 is connected to the upper surface of the dust discharge member 132 so that the hollow portion 131b is fluidly connected to the filter discharge port 139a. In this situation, the protrusions 132b formed on the upper surface of the dust discharge member 132 are inserted into the holes 131d formed on the lower surface of the filter discharge pipe 139 to allow the dust discharge member 132 to be rotated in accordance with the rotation of the filter unit 131.

Figure 7:
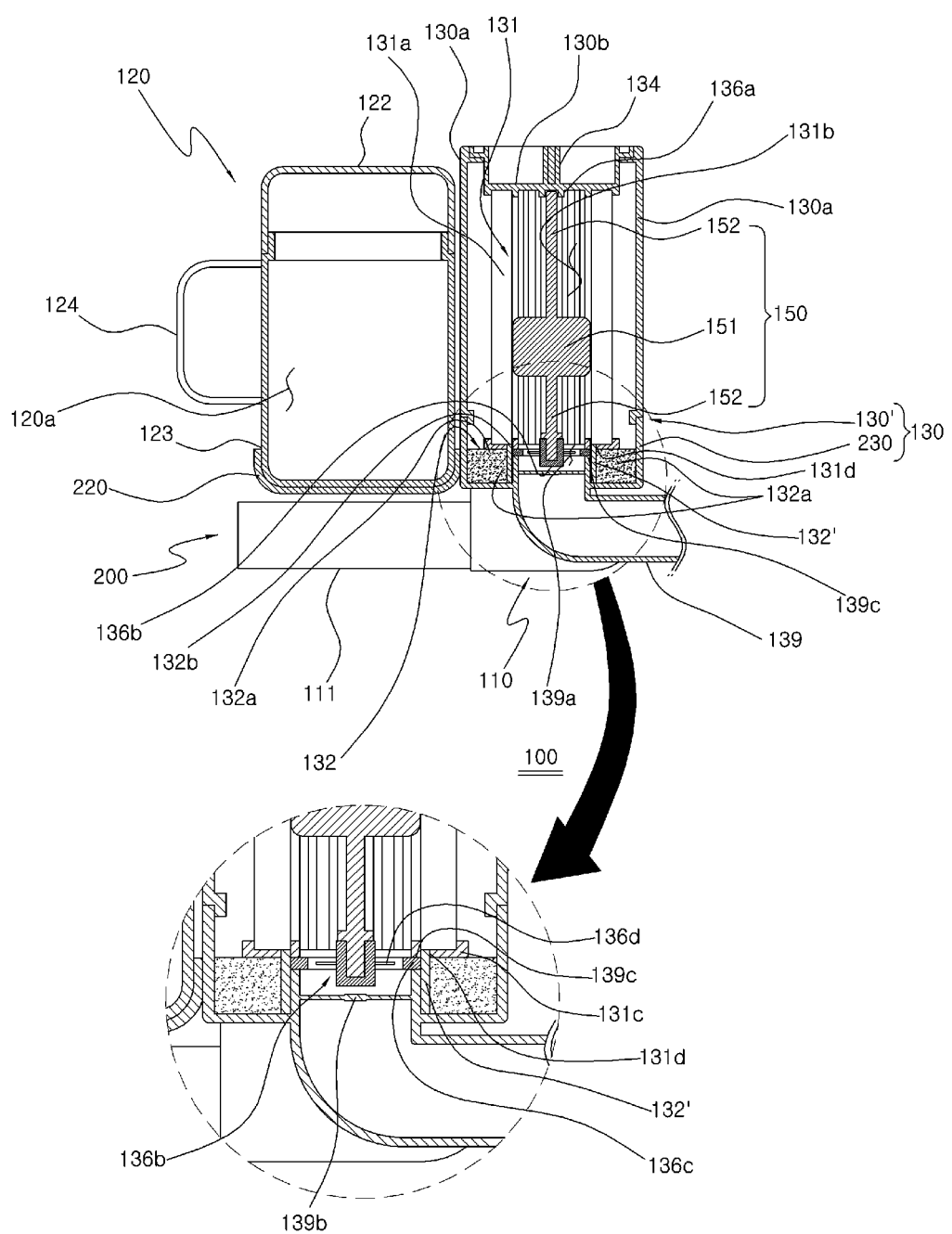
FIG. 7 is a cross section view of the example of the dust collecting apparatus of FIG. 1, taken on line VII-VII.

As the dust removing unit 150 is inserted into the hollow portion 131b, the side of the dust removing unit 150 is brought into contact with the inner surface of the filter member 131a, and the lower end of the lower supporting plate 152b is fixedly connected to the lower portion fixing member 136b (see FIG. 7).

In the state explained in the example above, as the filter casing cover 130b is connected to the upper portion of the filter casing 130a, the upper surface of the filter member 131a is connected to the lower surface of the filter casing cover 130b, and the upper end of the upper portion supporting plate 152a of the dust removing unit 150 is connected to the upper portion fixing unit 136a which is formed on the lower surface of the filter casing cover 130b.

Accordingly, when the filter casing cover 130b is rotated, the dust removing unit 150 stays in the stationary state, while the filter unit 131 and the dust discharge member 132 are rotated together with the filter casing cover 130b. The filter unit 131 may be rotated by a motor.

Operation of an example the above-described dust collecting apparatus 100 is explained below with reference to FIGS. 1 to 7.

As the vacuum cleaner (not illustrated) starts operating (the dust collecting apparatus 100 is mounted in the vacuum cleaner), an external air current including foreign matters, such as dusts, may be drawn into the centrifugal separating area 110c of the centrifugal separating portion 110 through the suction pipe 111.

The air current may be introduced into the centrifugal separating area 110c, and rotated about the stabilizer 112b and the discharge pipe 112, thereby generating a centrifugal force. Accordingly, relatively large or heavy dust particles may be centrifuged from the air current. The centrifuged dust particles of the centrifugal separating area 110c may then be discharged into the dust receptacle 120 through the opening 121.

The air current after centrifuging in the centrifugal separating area 110c may be passed through the discharge pipe 112, the discharge flow passage 112a, and the filter inlet 130d, and introduced into the filtering portion 130.

The air current introduced into the filtering portion 130 may enter the hollow portion 131b from outside the filter member 131a. In this process, the foreign matters including minute particles of dusts may be filtered out in the filter member 131a.

After passing through the filter member 131a, the remaining air current may be moved to the lower portion of the hollow portion 131b, and discharged out of the dust collecting apparatus 100 through the filter discharge port 139a and the filter discharge pipe 139 which form a downstream.

When minute dust particles are accumulated on the filter member 131a, the operator may separate the dusts 10 ("filter dusts") caught in the filter member 131a from the filter member 131a by using the dust removing unit 150.

Figure 8:
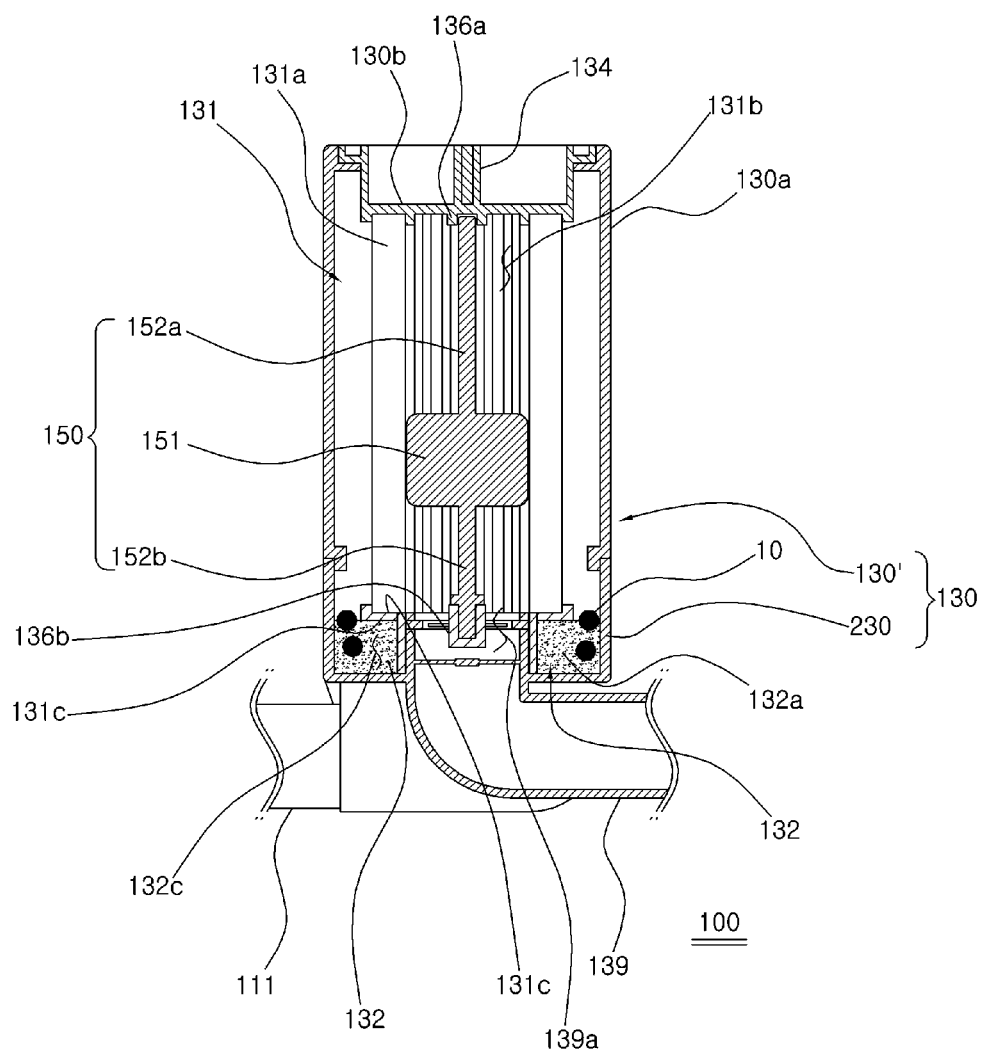
FIG. 8 is a cross section view of an example of a filtering portion.
Figure 9:
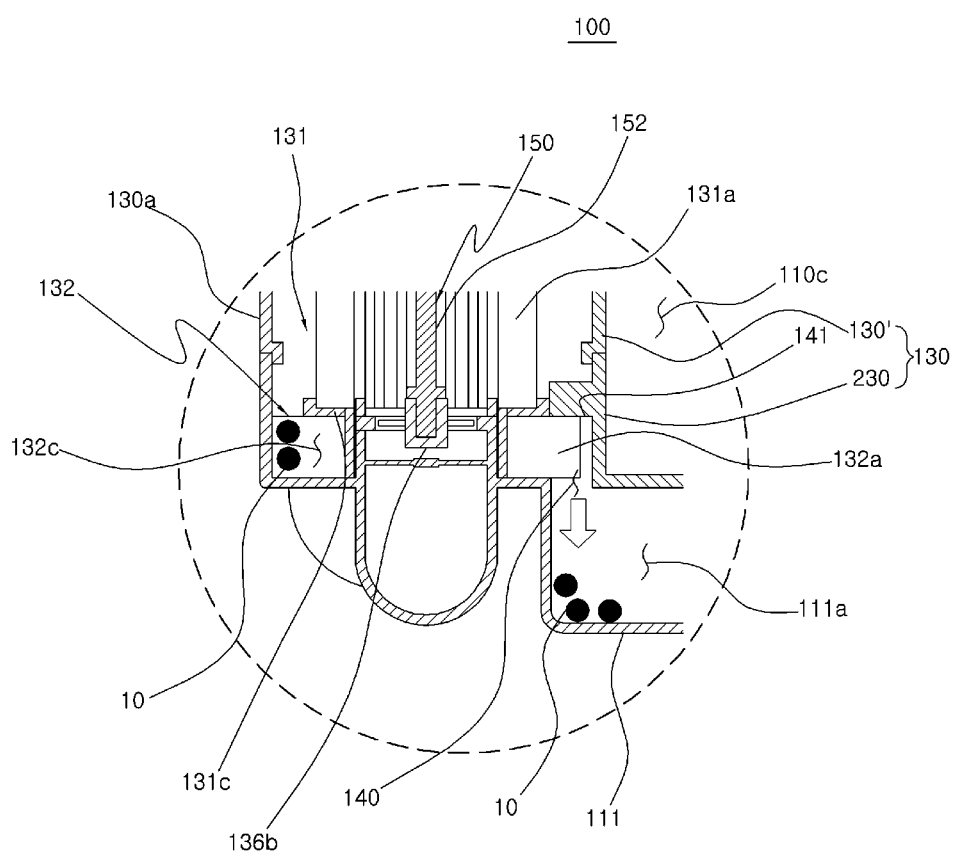
FIG. 9 illustrates an enlargement of the encircled portion IX of FIG. 4.

FIG. 8 illustrates a cross section view of an example of the filter unit. FIG. 9 illustrates an enlargement of the encircled portion IX of FIG. 4. The operation of removing dusts from the filter member 131a, and the operation of removing the filter dusts 10 is explained below with reference to FIGS. 8 and 9.

If the vacuum cleaner has deteriorated air exhaust due to an increased amount of dusts in the filter member 131a, the operator may rotate the filter casing cover 130b using the dust removing handle 134. In this situation, the vacuum cleaner may or may not be in operation.

When the filter casing cover 130b is rotated, the filter unit 131 formed within the filter casing 130a is also rotated. Since the dust removing unit 150 is in stationary state, the side of the dust removing plate 151 contacting the inner surface of the filter member 131a may collide against the filter member 131a, and thereby may cause the filter member 131a to vibrate and shed off the filter dusts 10.

The filter dusts 10 separated from the filter member 131a may be collected in the inter-vane areas 132c between the vanes 132a of the dust discharge member 132 by the dust removing plate 151.

Since the dust discharge member 132 is rotated together with the filter unit 131 in accordance with the rotation of the filter casing cover 130b, the inter-vane areas 132c are also rotated in accordance with the rotation of the dust discharge member 132. At this time, the vanes 132a in rotating motion wipe and thus move the filter dusts 10 collected in the inter-vane areas 132c.

When the inter-vane areas 132c are positioned above the dust discharge port 140 during their movement according to the rotation of the dust discharge member 132, the filter dusts 10, which are wiped and moved by the vanes 132a, may be discharged into the dust collecting area 111a of the suction pipe 111 through the dust discharge port 140.

The filter dusts 10 in the dust collecting area 111a may be introduced into the centrifugal separating area 110c by the air current which is drawn into the vacuum cleaner by the suction force, separated from the rotating air current, and discharged into the dust receptacle 120 through the opening 121. In the above process, the shielding portion 141 may screen the upper portion of the inter-vane areas 132c connected fluidly to the upper portion of the dust discharge portion 140, to thereby limit or prevent the upstream air stream introduced into the centrifugal separating portion 110 from entering the filter unit 130 directly.

The dust collecting apparatus 100 may provide improved user convenience, since the filter dusts 10 separated from the filter member 131a may be collected into the dust receptacle 120 automatically by the drawn-in air current.

The dust collecting apparatus 100 may have a minimal height, since the centrifugal separating portion 110, the dust receptacle 120, and the filter unit 130 are arranged in a horizontal direction. Additionally, since a vacuum cleaner (not illustrated) to which the dust collecting apparatus 100 is applied may have a minimal height, it may be possible to provide a vacuum cleaner in reduced size. Additionally, the vacuum cleaner may have a lowered center of gravity and increased stability in use.

In the dust collecting apparatus 100, since the centrifugal separating portion 110 and the filter unit 130 may be respectively separable into upper and lower centrifugal separating portions and upper and lower filter units, maintenance work such as repair or replacement of the centrifugal separating portion 110 and the filter unit 130 may become easy and convenient.

In the dust collecting apparatus 100, since the dust receptacle 120 is removable, the dust receptacle 120 alone may be taken out of the vacuum cleaner, and it may thus be unnecessary to separate the centrifugal separating portion 110 and the filter unit 130 from the vacuum cleaner. Accordingly, if an operator seeks to empty the dust receptacle 120, the operator may leave the dust collecting apparatus 100 mounted in the vacuum cleaner, and separate only the dust receptacle 120 and discard the collected dusts. Since convenience to the user may be improved in processes, such as dust disposal, the vacuum cleaner may provide an increase in overall convenience to the user.

Although the centrifugal separating portion 110 of the dust collecting apparatus 100 is depicted as a twin chamber type (which is in a vertical posture) in the examples above, the centrifugal separating portion 110 may be formed as a horizontal type (which is in a lain posture). Additionally, one or more centrifugal separating portions 110 may be employed.

The centrifugal separating portion 110 may include a main centrifugal separating portion to separate large and heavy dust particles, and a plurality of sub centrifugal separating portions (not illustrated) to remove minute dust particles from the air current which is once centrifuged in the main centrifugal separating portion.

Since dusts separated from the filter member may be collected in the dust receptacle, the possibility that the filter member is polluted again with the separated filter dusts is reduced or prevented.

The dust discharge member may provide increased reliability in the movement of the filter dusts.

A number of examples have been described above. Nevertheless, it will be understood that various modifications may be made. For example, suitable results may be achieved if the described techniques are performed in a different order and/or if components in a described system, architecture, device, apparatus or circuit are combined in a different manner and/or replaced or supplemented by other components or their equivalents. Accordingly, other implementations are within the scope of the following claims.

What is claimed is:

1. A dust collecting apparatus for a vacuum cleaner, the dust collecting apparatus comprising:
a centrifugal separating portion;
a dust receptacle configured to collect dust which is separated by the centrifugal separating portion; and
a filter portion comprising a filter unit configured to separate dust from an air current discharged from the centrifugal separating portion, the filter portion further comprising:
a dust removing unit configured to detach the filter dust caught in the filter unit; and
a dust discharge member configured to forcibly move the detached filter dust to an upstream of the centrifugal separating portion.

2. The dust collecting apparatus of claim 1, wherein the filter portion further comprises a filter casing comprising a dust discharge port which is formed therein and connected fluidly to the upstream of the centrifugal separating portion.

3. The dust collecting apparatus of claim 2, wherein the filter casing further comprises a shielding portion configured to cover an upper portion of the dust discharge member.

4. The dust collecting apparatus of claim 1, wherein the filter unit and the dust discharge member are configured to be rotated together upon rotation of the filter unit.

5. The dust collecting apparatus of claim 4, wherein:
the filter unit further comprises a seating member configured to be rotated integrally with the dust discharge member; and
the dust removing unit is further configured to contact an inner surface of the filter unit.

6. The dust collecting apparatus of claim 1, wherein the dust discharge member comprises:
a pipe engaged on a lower portion of the filter unit; and
a plurality of vanes connected to the pipe.

7. The dust collecting apparatus of claim 6, wherein the plurality of vanes, when the filter unit is rotated, are configured to move the detached filter dust to the dust discharge port.

8. The dust collecting apparatus of claim 6, wherein the dust discharge member further comprises a plurality of protrusions extended from an upper surface of the pipe in a radial direction.

9. The dust collecting apparatus of claim 1, wherein the dust receptacle is configured to be mountable to and demountable from the dust collecting apparatus.

10. The dust collecting apparatus of claim 1, wherein the centrifugal separating portion, the dust receptacle and the filtering portion are arranged in a horizontal direction in a parallel relationship.

11. The dust collecting apparatus of claim 1, further comprising:
a dust receptacle mounting portion where the dust receptacle is mounted to and demounted from,
wherein the centrifugal separating portion comprises upper and lower centrifugal separating portions configured to be detachably connected to each other,
wherein the filtering portion comprises upper and lower filtering portions configured to be detachably connected to each other, and
wherein the lower centrifugal separating portion, the lower filtering portion, and the dust receptacle mounting portion are integrally formed with each other.

12. The dust collecting apparatus of claim 11, wherein the upper centrifugal separating portion and the upper filtering portion are integrally formed with each other.

13. A dust collecting apparatus for a vacuum cleaner, the dust collecting apparatus comprising:
a suction pipe configured to draw in an external air stream;
a centrifugal separating portion configured to receive the air stream from the suction pipe and separate dust therefrom;
a filter portion comprising a filter unit and configured to:
receive the air stream from the centrifugal separating portion; and
remove residual dust from the air stream by passing the air stream through the filter unit; and
a dust removing unit positioned inside the filter portion and configured to detach the residual dust from the filter unit;
wherein the air stream is discharged from the filter portion after passing through the filter unit, and
wherein the detached residual dust is discharged from the filter portion by a dust discharge member to an upstream of the centrifugal separating portion such that the detached residual dust is drawn into the centrifugal separating portion with a new external air stream through the suction pipe.

14. The dust collecting apparatus of claim 13 wherein:
the filter unit is configured to be selectively rotatable within the filter portion, to rotate relative to the dust removing unit; and
at least a portion of the dust removing unit contacts the filter unit to detach the residual dust therefrom.

15. A dust collecting apparatus, comprising:
a centrifugal separating portion;
a filter portion configured to receive an air stream from the centrifugal separating portion, the filter portion comprising:
a filter unit through which and the air stream passes, and configured to separate dust from the air stream;
a dust removing unit disposed inside the filter unit and configured to detach dust from the filter unit upon action from an operator; and
a dust discharge member configured to discharge the detached dust from the filter portion to an upstream of the centrifugal separating portion.

16. The dust collecting apparatus of claim 15, wherein:
the filter unit is configured to be rotated within the filter portion relative to the dust removing unit upon the action from the operator; and
the dust removing unit comprises a dust removing plate configured to:
contact the filter unit; and
cause the dust to detach from the filter unit.

* * * * *